(12) United States Patent
Ogita et al.

(10) Patent No.: US 11,556,179 B2
(45) Date of Patent: Jan. 17, 2023

(54) HAPTIC PRESENTATION APPARATUS, HAPTIC PRESENTATION SYSTEM, AND HAPTIC PRESENTATION METHOD

(71) Applicant: SONY GROUP CORPORATION, Tokyo (JP)

(72) Inventors: Takeshi Ogita, Tokyo (JP); Osamu Ito, Tokyo (JP); Hiroshi Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/419,935

(22) PCT Filed: Dec. 25, 2019

(86) PCT No.: PCT/JP2019/050771
§ 371 (c)(1),
(2) Date: Jun. 30, 2021

(87) PCT Pub. No.: WO2020/145144
PCT Pub. Date: Jul. 16, 2020

(65) Prior Publication Data
US 2022/0083140 A1 Mar. 17, 2022

(30) Foreign Application Priority Data
Jan. 10, 2019 (JP) .............................. JP2019-002651

(51) Int. Cl.
*G06F 3/01* (2006.01)
(52) U.S. Cl.
CPC .............. *G06F 3/016* (2013.01); *G06F 3/014* (2013.01)

(58) Field of Classification Search
CPC .................................. G06F 3/016; G06F 3/014
See application file for complete search history.

(56) References Cited

U.S. PATENT DOCUMENTS

2016/0185267 A1 6/2016 Nahman et al.
2016/0363997 A1* 12/2016 Black ...................... G06F 3/014
(Continued)

FOREIGN PATENT DOCUMENTS

| CN | 105739376 A | 7/2016 |
| EP | 3040844 A1 | 7/2016 |

(Continued)

OTHER PUBLICATIONS

International Search Report and Written Opinion of PCT Application No. PCT/JP2019/050771, dated Feb. 10, 2020, 09 pages of ISRWO.

*Primary Examiner* — Towfiq Elahi
(74) *Attorney, Agent, or Firm* — Chip Law Group

(57) ABSTRACT

This haptic presentation apparatus includes a first haptic presentation element that includes an air-tight and flexible first pouch into which an object has been inserted and is capable of presenting, by using an amount of gas to be exhausted from an interior of the first pouch, hardness of a virtual object in response to an operation of holding the virtual object by a user, and a second haptic presentation element that includes an air-tight and flexible second pouch and is capable of presenting, by using an amount of gas to be supplied to an interior of the second pouch, elasticity of the virtual object in response to the operation of holding the virtual object by the user.

10 Claims, 19 Drawing Sheets

(56) References Cited

U.S. PATENT DOCUMENTS

2017/0131769 A1    5/2017   Keller et al.
2018/0107277 A1    4/2018   Keller et al.
2021/0096649 A1*   4/2021   Mok ..................... G06F 3/016

FOREIGN PATENT DOCUMENTS

| JP | 2004-029999 A | 1/2004 |
| JP | 2013-515329 A | 5/2013 |
| JP | 2016-126785 A | 7/2016 |

\* cited by examiner

HAPTIC PRESENTATION APPARATUS, HAPTIC PRESENTATION SYSTEM, AND HAPTIC PRESENTATION METHOD

CROSS REFERENCE TO RELATED APPLICATIONS

This application is a U.S. National Phase of International Patent Application No. PCT/JP2019/050771 filed on Dec. 25, 2019, which claims priority benefit of Japanese Patent Application No. JP 2019-002651 filed in the Japan Patent Office on Jan. 10, 2019. Each of the above-referenced applications is hereby incorporated herein by reference in its entirety.

TECHNICAL FIELD

The present technology relates to a haptic presentation apparatus, a haptic presentation system, and a haptic presentation method that are available in augmented reality (AR), for example.

BACKGROUND ART

In recent years, an operation that feeds back, in response to a manual operation of a user for an object by computer graphics in augmented reality (AR) or the like, the haptic perception according to the characteristics such as the size, hardness, and elasticity of the object is researched and developed.

For example, Patent Literature 1 discloses a glove-type haptic feedback device that employs a number of individual fluid chambers. The individual fluid chambers are each a microchamber in which an electrorheological fluid is enclosed, and the viscosity of the electrorheological fluid is changed by applying an electric field to both ends of the microchamber, thereby presenting the hardness of an object.

Patent Literature 2 discloses a type of haptic display hand that is worn on the back of the hand. This haptic display hand presents the haptic perception to a user using a pneumatic actuator that extends in the lengthwise direction by application of pneumatic pressure.

CITATION LIST

Non-Patent Literature

Patent Literature 1 Japanese Unexamined Patent Application Publication No. 2013-515329
Patent Literature 2 Japanese Patent Application Laid-open No. 2004-29999

DISCLOSURE OF INVENTION

Technical Problem

However, in the past, a haptic presentation apparatus worn on a user's hand does not achieve sufficient user satisfaction in various aspects of performance, functions, sizes, prices, and the like, and further improvement toward generalization is expected.

In view of the circumstances as describe above, it is an object of the present technology to provide a haptic presentation apparatus, a haptic presentation system, a and haptic presentation method that are capable of improving user satisfaction in various aspects of performance, functions, sizes, prices, and the like.

Solution to Problem

In order to achieve the above-mentioned object, a haptic presentation apparatus according to the present technology includes: a first haptic presentation element that includes an air-tight and flexible first pouch into which an object has been inserted and is capable of presenting, by using an amount of gas to be exhausted from an interior of the first pouch, hardness of a virtual object in response to an operation of holding the virtual object by a user.

As a result, it is possible to realize a haptic presentation apparatus with high user satisfaction in various aspects of performance, functions, sizes, and prices.

It is favorable that the first haptic presentation element is disposed on a side of a back of a hand of the user. As a result, the degree of freedom of the hand of the user is improved, and the overall operability is improved.

The haptic presentation apparatus according to the present technology may further include a first variable unit that varies an amount of gas to be exhausted to the interior of the first pouch. By varying the amount of gas to be exhausted, it is possible to present various levels of hardness of the virtual object.

The first haptic presentation element may be disposed to abut against a thumb and an index finger of the hand of the user, and a web portion for enhancing a sense of resistance in response to the operation of holding the virtual object may be provided to span between portions corresponding to the thumb and the index finger.

The haptic presentation apparatus according to the present technology may further include a second haptic presentation element that includes an air-tight and flexible second pouch and is capable of presenting, by using an amount of gas to be supplied to an interior of the second pouch, elasticity of the virtual object in response to the operation of holding the virtual object by the user.

As a result, it is possible to present elasticity in addition to the hardness of the virtual object.

It is favorable that the second haptic presentation element is disposed on a side of a palm of the user.

The haptic presentation apparatus according to the present technology may further include a second variable unit that varies an amount of gas to be supplied to the interior of the second pouch.

The haptic presentation apparatus according to the present technology may further include a vibration device that presents, by vibration, that the user has touched the virtual object.

MODE(S) FOR CARRYING OUT THE INVENTION

Hereinafter, embodiments of the present technology will be described with reference to the drawings.

First Embodiment

[Haptic Presentation Apparatus]

Figure 1:
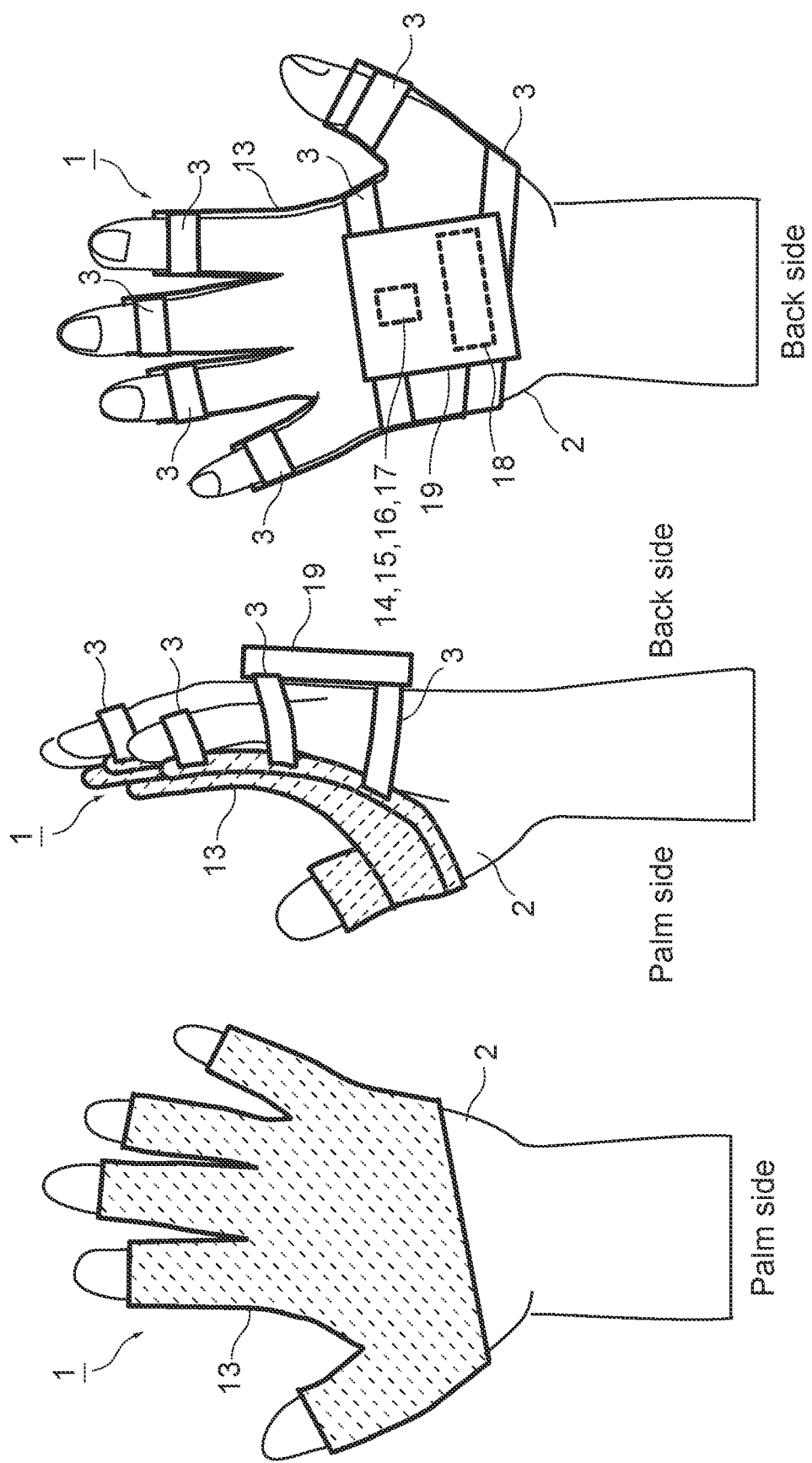
FIG. 1 is a side surface view of a haptic presentation apparatus 1 according to this embodiment as viewed from three directions.

FIG. 1 is a side surface view of a haptic presentation apparatus 1 according to this embodiment as viewed from three directions.

This haptic presentation apparatus 1 is attached to a hand 2 of a user wearing VR/AR glasses 30 and presents, to the user, the haptic perception when the user holds a virtual object in a VR//AR space.

Figure 2:
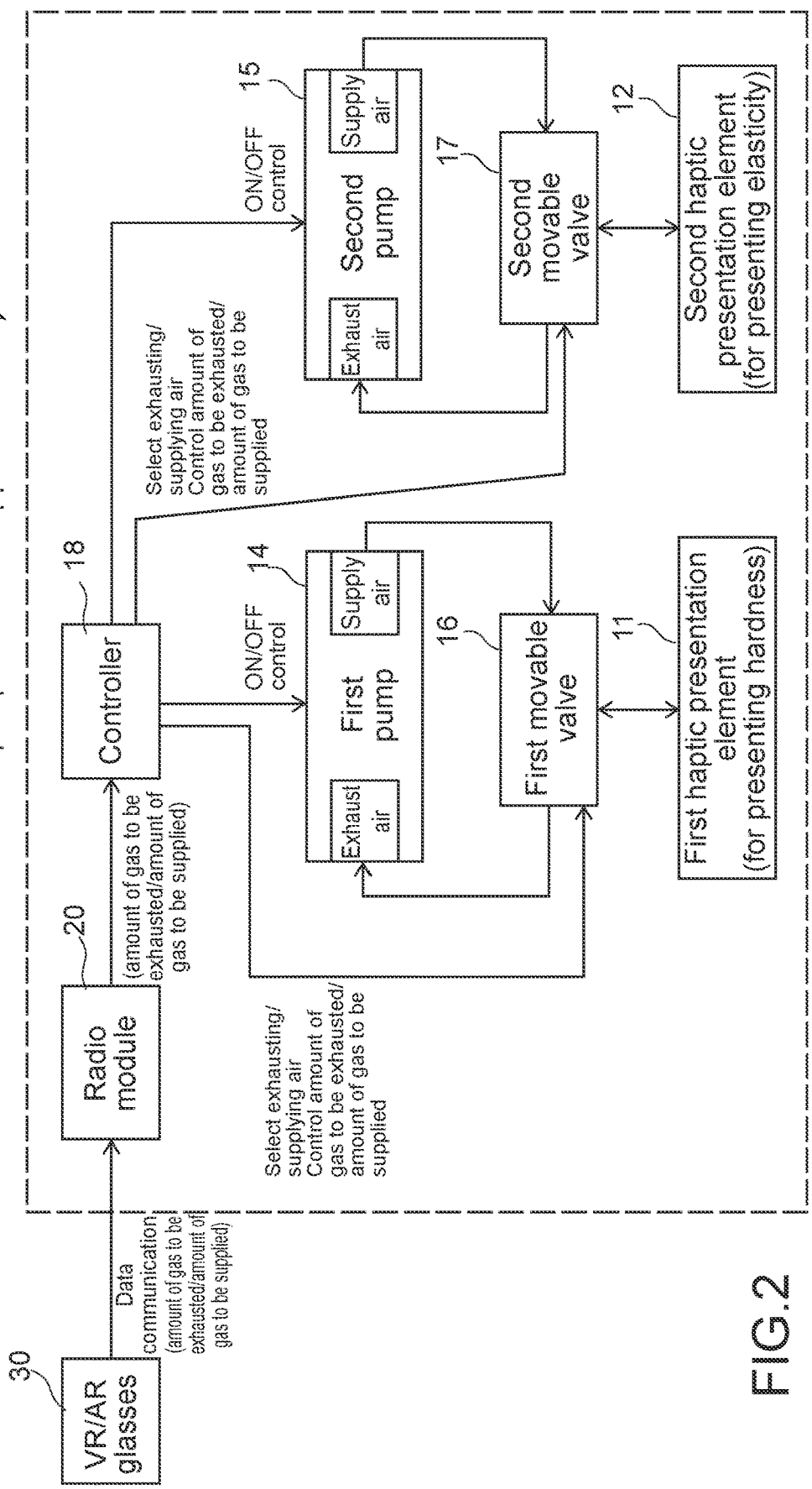
FIG. 2 is a block diagram showing a configuration of a haptic presentation system 100 that includes the haptic presentation apparatus 1 in FIG. 1.

FIG. 2 is a block diagram showing a configuration of a haptic presentation system 100 that includes the haptic presentation apparatus 1.

The haptic presentation system 100 includes the haptic presentation apparatus 1 and the VR/AR glasses 30. The VR/AR glasses 30 correspond to the "control unit" in the claims.

The haptic presentation apparatus 1 includes a haptic presentation unit 13 that includes a first haptic presentation element 11 for presenting the hardness as one of the haptic perceptions in response to the operation of holding a virtual object in a VR/AR space and a second haptic presentation element 12 capable of presenting, to the user, the elasticity of the virtual object in response to the operation of holding the virtual object, a first pump 14, a second pump 15, a first movable valve 16, a second movable valve 17, a controller 18, and a radio module 20. As shown in FIG. 1, the haptic presentation unit 13 is attached to the hand 2 of the user using an attachment device 3 such as a band, together with the control unit 19 on which the first pump 14, the second pump 15, the first movable valve 16, the second movable valve 17, and the controller 18 are mounted. Note that the first pump 14, the first movable valve 16, and the controller 18 correspond to the "first variable part" in the claims, and the second pump 15, the second movable valve 17, and the controller 18 correspond to the "second variable unit".

Figure 3:
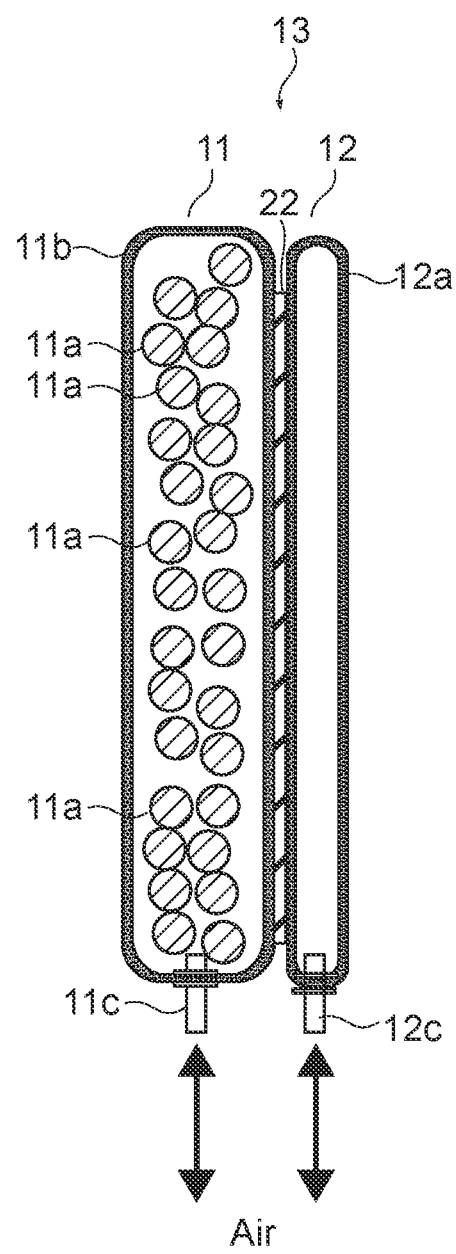
FIG. 3 is a cross-sectional view showing a configuration of a haptic presentation unit 13 in the haptic presentation apparatus 1 in FIG. 1.

FIG. 3 is a cross-sectional view showing a configuration of the haptic presentation unit 13.

The haptic presentation unit 13 includes the first haptic presentation element 11 and the second haptic presentation element 12. In this embodiment, the first haptic presentation element 11 and the second haptic presentation element 12 are superimposed on each other via an adhesive layer 22.

Figure 4:
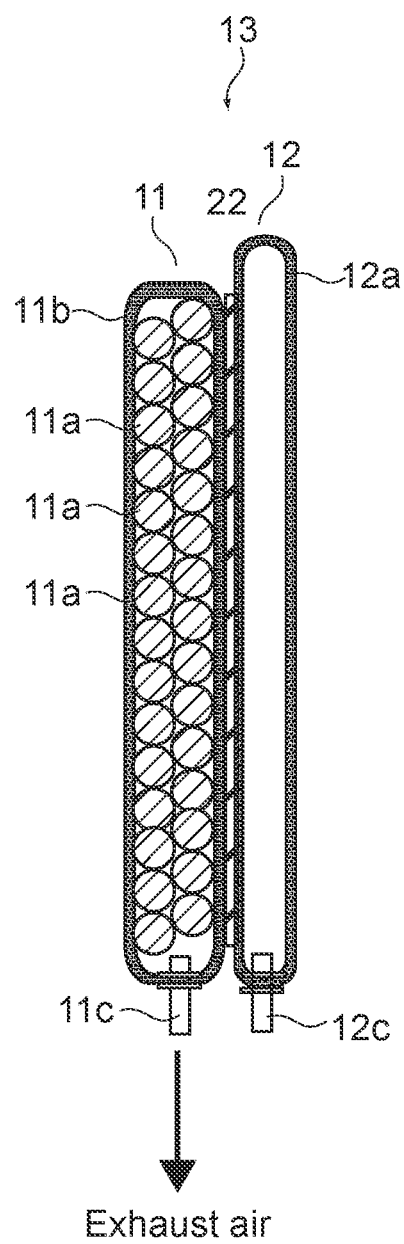
FIG. 4 is a diagram for describing the presentation principles of hardness in the haptic presentation unit 13.

The first haptic presentation element 11 includes an air-tight and flexible first pouch 11b into which an object 11a is inserted. Examples of the object 11a to be housed in the first pouch 11b include a number of particles and cloths. As shown in FIG. 4, when the air in the first pouch 11b is exhausted by the first pump 14 and the pressure inside the first haptic presentation element 11 is reduced, whereby the objects 11a in the first pouch 11b condense and the stiffness of the entire first haptic presentation element 11 increases. The increased stiffness of the entire first haptic presentation element 11 generates a sense of resistance in response to the movement of fingers when holding the virtual object, and this sense of resistance is presented to the user as the hardness of the virtual object.

The first pouch 11b is connected to the exhaust system of the first pump 14 via an air pipe 11c and the first movable valve 16. The first movable valve 16 is a valve that switches the connection with the first pouch 11b between the exhaust system and the air supply system of the first pump 14. That is, when the first pouch 11b is connected to the exhaust system of the first pump 14 by the first movable valve 16, the air in the first pouch 11b is exhausted by the first pump 14. When the first pouch 11b is connected to the air supply system of the first pump 14 by the first movable valve 16, air is introduced into the first pouch 11b.

Figure 5:
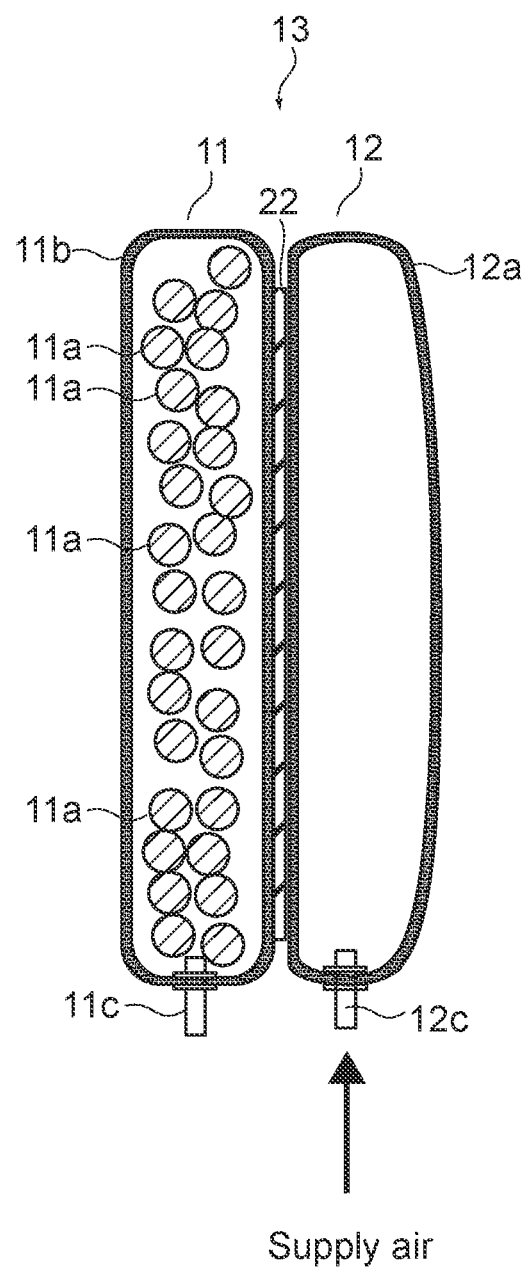
FIG. 5 is a diagram for describing the presentation principles of elasticity in the haptic presentation unit 13.

The second haptic presentation element 12 includes an air-tight and flexible second pouch 12a. As shown in FIG. 5, air is supplied to the interior of the second pouch 12a via an air pipe 12c and the second movable valve 17 by the second pump 15 and the pressure inside the second pouch 12a increases, whereby the elasticity of the entire second haptic presentation element 12 increases. When the total elasticity of the second haptic presentation element 12 increases, the elasticity sensed by the user through the fingers in the operation of holding the virtual object presents the elasticity of the virtual object to the user.

The second pouch 12a is connected to the second pump 15 via the air pipes 12c and the second movable valve 17. The second movable valve 17 switches the connection with the second pouch 12a between the exhaust system and the air supply system of the second pump 15. That is, when the second pouch 12a is connected to the air supply system of the second pump 15 by the second movable valve 17, air is introduced into the second pouch 12a. When the second pouch 12a is connected to the exhaust system of the second pump 15 by the second movable valve 17, the air in the second pouch 12a is exhausted.

Each of the first pump 14, the second pump 15, the first movable valve 16, and the second movable valve 17 described above is controlled individually by the controller 18. That is, the controller 18 is capable of individually performing control of switching on/off of the first pump 14 and the second pump 15. In addition, the controller 18 is capable of individually perform switching between exhaust/air supply of the first movable valve 16 and control of the amount of gas to be exhausted and the applying amount.

The controller 18 receives, via the radio module 20, control information for controlling the first haptic presentation element 11 and the second haptic presentation element 12, which has been transmitted from a VR/AR-supported wearable device such as the VR/AR glasses 30, and is capable of controlling, on the basis of this control information, the first haptic presentation element 11 and the second haptic presentation element 12. The CPU of the VR/AR glasses 30 detects the position and movement of a hand of a user in a VR/AR space in which a virtual object is placed. The CPU of the VR/AR glasses 30 generates, on the basis of predefined property information for the virtual object, the results of detecting the position and movement of the hand of the user, and the like, control information for controlling the first haptic presentation element 11 and the second haptic presentation element 12, and wirelessly transmits the generated control information to the haptic presentation apparatus 1. The haptic presentation apparatus 1 receives the control information from the VR/AR glasses 30 using the radio module 20. The controller 18 of the haptic presentation apparatus 1 controls, on the basis of the received control information, the haptic presentation element 11 and the second haptic presentation element 12 that control the first pump 14, the second pump 15, the first movable valve 16, and the second movable valve 17, and presents, to the user, the haptic perception according to the properties of the virtual object.

(Regarding Properties of Virtual Object)

As the properties of the virtual object, pieces of information such as the hardness of the virtual object (hereinafter, referred to simply as the "hardness") and elasticity are defined. For the sake of simplicity, the hardness information is expressed by two types of "hard" and "soft". The elasticity information is expressed by three types of "strong elasticity", "weak elasticity", and "no elasticity". It goes without saying that information may be provided at a higher resolution for each of the hardness and the elasticity.

For example, sponges, stuffed toys, and the like have properties of "soft and having weak elasticity".

Canned drinks and the like have properties of "hard and having no elasticity".

Balloons and the like have properties of "soft and having strong elasticity".

Tennis balls and the like have properties of "hard and having strong elasticity".

Figure 6:
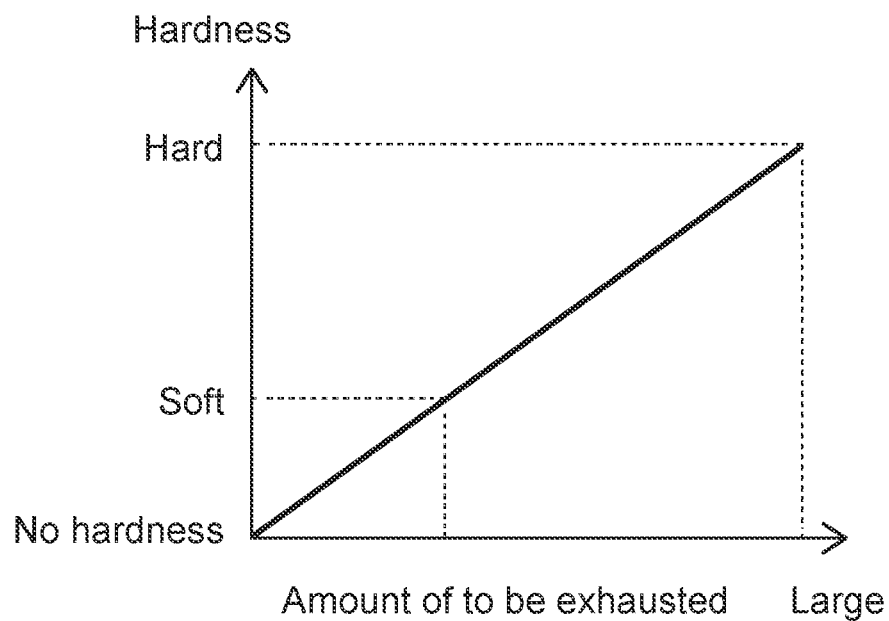
FIG. 6 is a graph showing the correlation between the hardness and the degassing amount.

FIG. 6 is a graph showing the correlation between the hardness and the degassing amount. Thus, the "hardness" presented by the first haptic presentation element 11 increases as the "amount of gas to be exhausted" increases. Therefore, in the case of presenting "soft hardness", air only needs to be evacuated from the first haptic presentation element 11 at the "amount of gas to be exhausted" according to the softness of the target virtual object within a range less than the "amount of gas to be exhausted" when presenting the "hard hardness".

Figure 7:
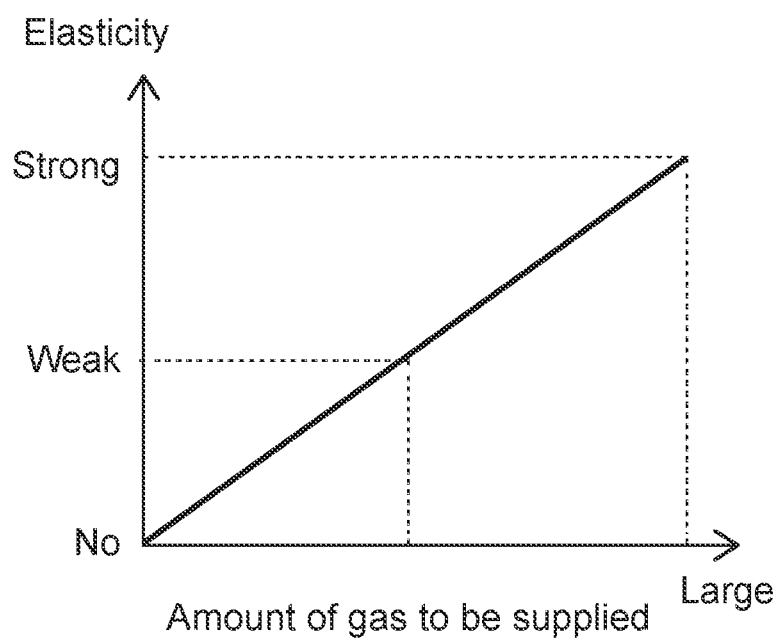
FIG. 7 is a graph showing the correlation between the elasticity and the amount of supplied gas.

FIG. 7 is a graph showing the correlation between the "elasticity" and the "amount of supplied gas". Thus, the "elasticity" presented by the second haptic presentation element 12 increases as the "amount of supplied gas" increases. Therefore, in the case of presenting "weak elasticity", air only needs to be introduced into the second haptic presentation element 12 at the "amount of supplied gas" according to the elasticity of the target virtual object within a range less than the "amount of supplied gas" when presenting "strong elasticity".

Figure 8:
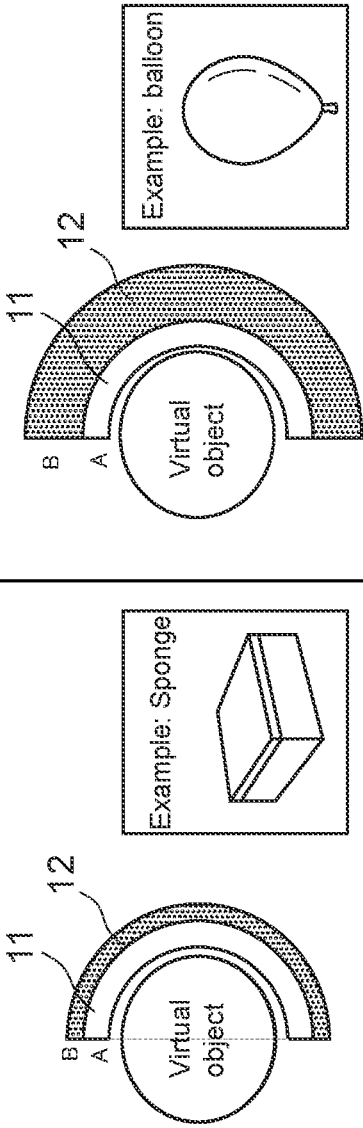
FIG. 8 is a diagram summarizing the control of the haptic presentation unit 13 for the respective properties of the hardness and elasticity of the virtual object.

FIG. 8 is a diagram summarizing the control of the haptic presentation unit 13 for the respective properties of the hardness and elasticity of the virtual object.

In the case where the virtual object is one that is "soft and has weak elasticity" such as sponges and stuffed toys, the CPU of the VR/AR glasses 30 transmits, to the haptic presentation apparatus 1, control information for exhausting the air from the first pouch 11b of the first haptic presentation element 11 by the amount of gas to be exhausted corresponding to the property of "soft" and control information for introducing air into the second pouch 12a of the second haptic presentation element 12 by the amount of supplied gas corresponding to the property of "weak elasticity". This provides the user with haptic perception that is "soft and has weak elasticity" when holding sponges, stuffed toys, or the like in the hand, through the haptic presentation apparatus 1.

In the case where the virtual object is one that is "hard and has no elasticity" such as canned drinks, the CPU of the VR/AR glasses 30 transmits, to the haptic presentation apparatus 1, control information for exhausting the air from the first pouch 11b of the first haptic presentation element 11 by the amount of gas to be exhausted corresponding to the property of "hard" and control information for introducing air into the second pouch 12a of the second haptic presentation element 12 by the amount of supplied gas corresponding to the property of "no elasticity". This presents the user with haptic perception that is "hard and has no elasticity" when holding a canned drink or the like in the hand, through the haptic presentation apparatus 1.

In the case where the virtual object is one that is "soft and has strong elasticity" such as a balloon, the CPU of the VR/AR glasses 30 transmits, to the haptic presentation apparatus 1, control information for exhausting the air from the first pouch 11b of the first haptic presentation element 11 by the amount of gas to be exhausted corresponding to the property of "soft" and control information for introducing air into the second pouch 12a of the second haptic presentation element 12 by the amount of supplied gas corresponding to the property of "strong elasticity". This provides the user with haptic perception that is "soft and has strong elasticity" when holding a balloon or the like in the hand, through the haptic presentation apparatus 1.

Then, in the case where the virtual object is one that is a "hard and has strong elasticity" such as a tennis ball, the CPU of the VR/AR glasses 30 transmits, to the haptic presentation apparatus 1, control information for exhausting the air from the first pouch 11b of the first haptic presentation element 11 by the amount of exhaust gas corresponding to the property of "hard" and control information for introducing air into the second pouch 12a of the second haptic presentation element 12 by the amount of supplied gas corresponding to the property of "strong elasticity". This presents the user with haptic perception that is "hard and has strong elasticity" when holding a tennis ball or the like in the hand, through the haptic presentation apparatus 1.

Next, the control of the haptic presentation unit 13 on the position and movement of a hand of a user relative to a virtual object will be described in detail.

Figure 9:
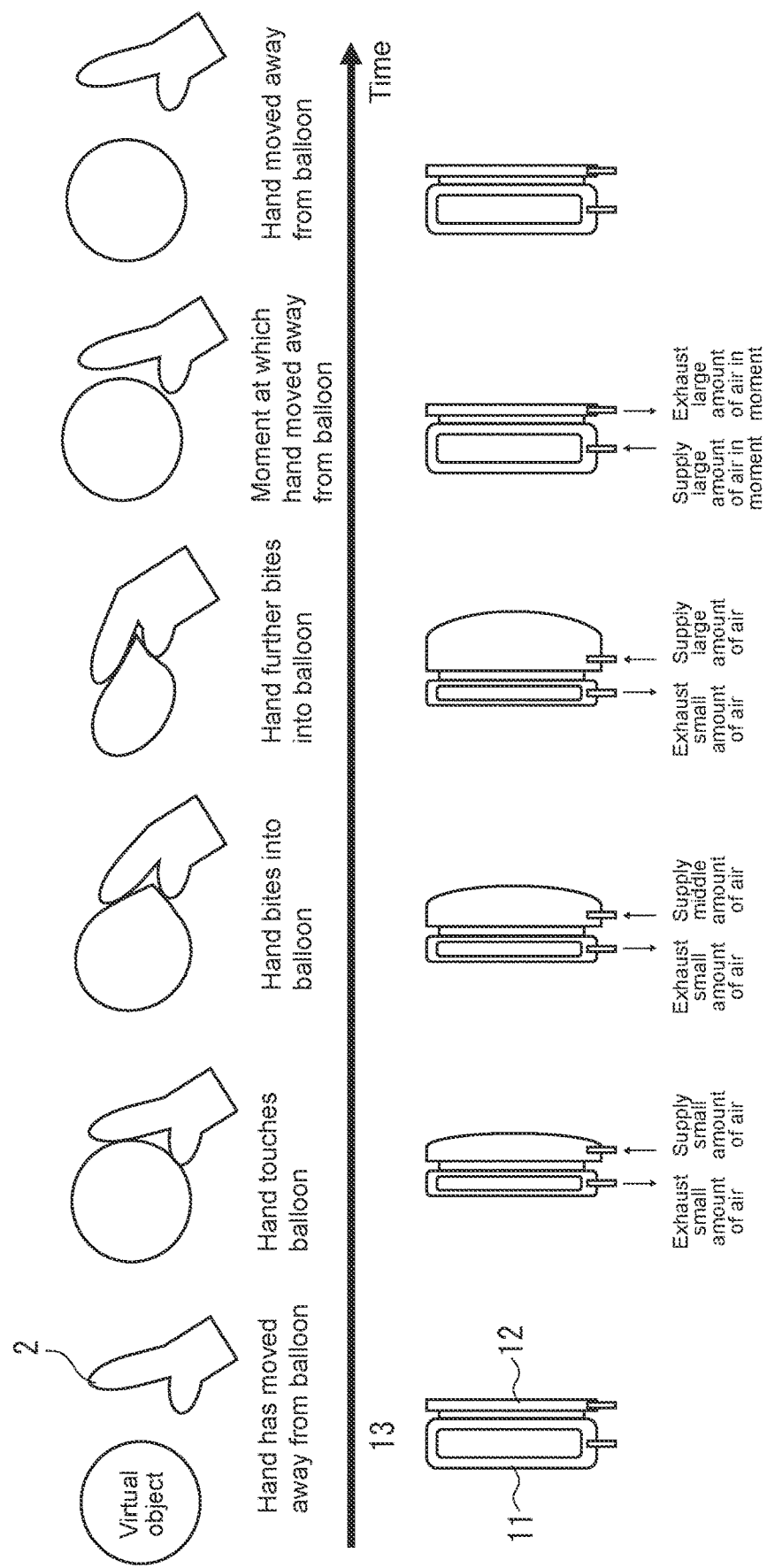
FIG. 9 is a diagram showing a flow of the control of the haptic presentation unit 13 on the position and movement of a hand 2 of a user relative to the virtual object along the time.

FIG. 9 is a diagram showing a flow of the control of the haptic presentation unit 13 on the position and movement of the hand 2 of the user relative to the virtual object along the time.

Figure 10:
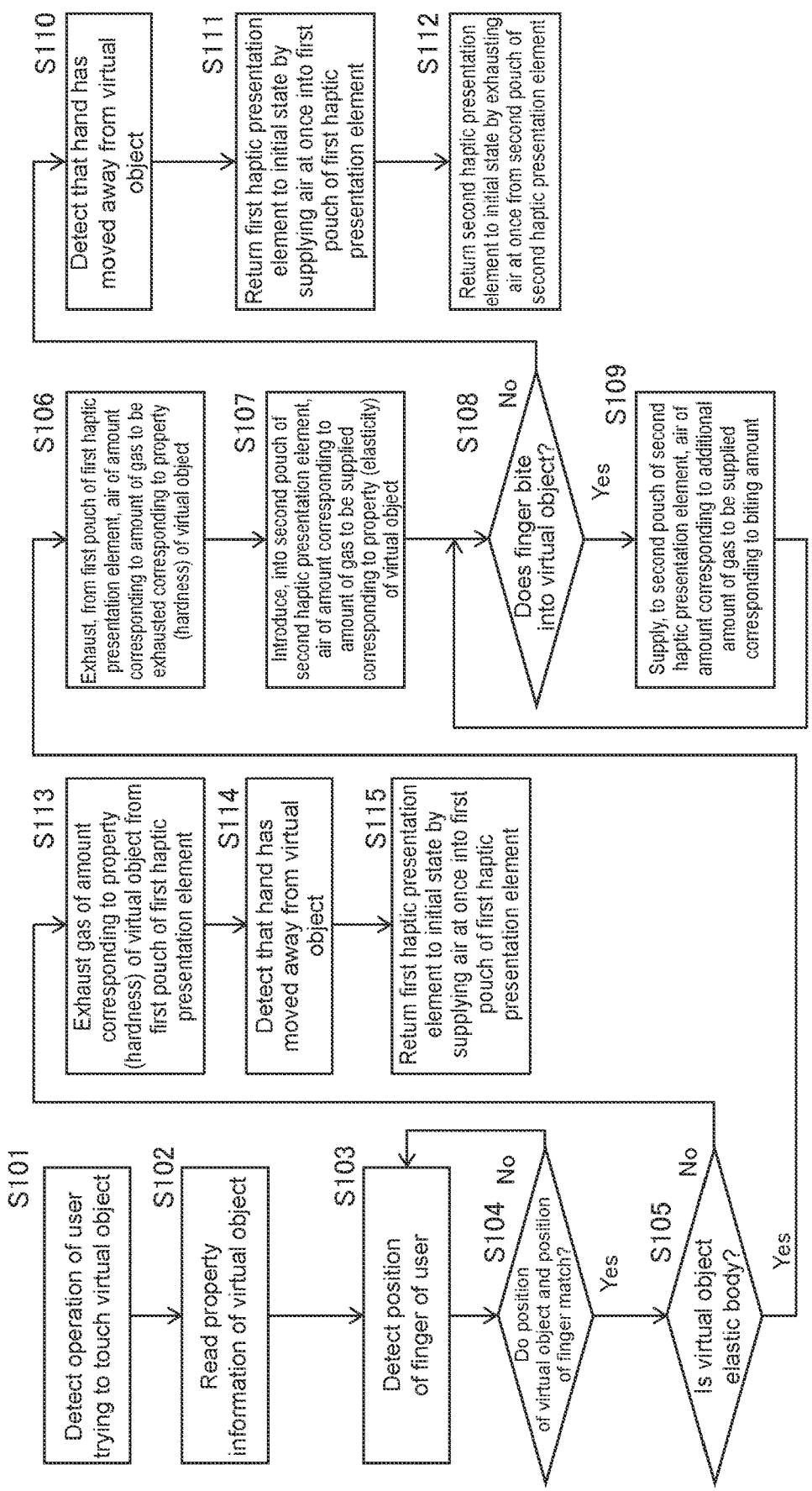
FIG. 10 is a flowchart showing the flow of the above-mentioned control by a CPU of VR/AR glasses 30.

FIG. 10 is a flowchart showing the flow of the above-mentioned control by the CPU of VR/AR glasses 30.

Here, assumption is made that the virtual object is a balloon.

The CPU of the VR/AR glasses 30 tracks the positional relationship between a virtual object and a hand of a user to which the haptic presentation apparatus 1 is attached in a VR/AR space in which the virtual object is placed. While the distance between the virtual object and the hand of the user is equal to or larger than a predetermined value in the VR/AR space, the control amount of the haptic presentation apparatus 1 is set to zero. Therefore, during this time, each of the first haptic presentation element 11 and the second haptic presentation element 12 of the haptic presentation apparatus 1 is in the initial state. In the initial state of the first haptic presentation element 11, a certain amount of air has been introduced into the first pouch 11b and the total stiffness of the first haptic presentation element 11 is low. Meanwhile, in the initial state of the second haptic presentation element 12, air from the second pump 15 is not supplied into the second pouch 12a or a certain amount (small amount) of air has been introduced into the second pouch 12a.

The CPU of the VR/AR glasses 30 detects, in the case where the distance between the virtual object and the hand of the user is less than the predetermined value in the VR/AR space, this fact as the operation of the user trying to touch the virtual object (Step S101). When the CPU of the VR/AR glasses 30 detects the operation of the user trying to the virtual object, the CPU of the VR/AR glasses 30 reads the property information of the corresponding virtual object from the storage unit in which the pieces of property information of the respective virtual objects has been stored (Step S102).

Next, the CPU of the VR/AR glasses 30 detects the position of a finger of the user in the VR/AR space (Step S103), generates, when the position of the finger of the user matches the position of the virtual object (Yes in Step S104), control information for exhausting the air of the amount corresponding to the amount of gas to be exhausted corresponding to the hardness, which is the property information of the virtual object, from the first pouch 11b of the first haptic presentation element 11 and control information for introducing the air of the amount corresponding to the amount of gas to be supplied corresponding to the elasticity, which is another piece of property information of the virtual object, into the second pouch 12a of the second haptic presentation element 12, and wirelessly transmits the pieces of generated control information to the haptic presentation apparatus 1. As a result, the hardness of the first haptic presentation element 11 and the elasticity of the second haptic presentation element 12 in the haptic presentation unit 13 of the haptic presentation apparatus 100 are determined (Steps S106 and 107).

After that, when recognizing, on the basis of the information regarding virtual object sizes and the distance between the thumb and index finger, for example, a finger of the hand of the user bites into the virtual object (Yes in Step S108), the CPU of the VR/AR glasses 30 generates control information for supplying air of the amount corresponding to an additional amount of gas to be supplied corresponding to the biting amount to the second pouch 12a of the second haptic presentation element 12 and wirelessly transmits the generated control information to the haptic presentation apparatus 1. As a result, the haptic presentation of the elasticity that increases as the finger of the hand of the user bites into the virtual object deeper is presented (Step S109).

This additional supply of air is carried out while the finger of the hand of the user bites into the virtual object, corresponding to the biting amount and within a range that does not exceed the predetermined upper limit value of the total amount of gas to be supplied.

After that, when detecting that the hand of the user has moved away from the virtual object (Step S110), the CPU of the VR/AR glasses 30 transmits, to the haptic presentation apparatus 1, control information for returning the first haptic presentation element 11 to the initial state by supplying air at once into the first pouch 11b of the first haptic presentation element 11 that is in a depressurized state and control information for returning the second haptic presentation element 12 to the initial state by exhausting the air at once from the second pouch 12a of the second haptic presentation element 12 that is in a high-pressure state. As a result, both the first haptic presentation element 11 and the second haptic presentation element 12 of the haptic presentation apparatus 1 return to the initial state (Steps S111 and 112).

(Operation in Case where Virtual Object is Inelastic Body)

The above is the flow of the operation in the case where the virtual object has elasticity as properties, like a balloon. Similar processing is performed also in the case where the virtual object is "soft and has strong elasticity" like a tennis ball. In this case, in order to present the "hardness" by controlling the first haptic presentation element 11, the amount of gas exhausted from the first pouch 11b of the first haptic presentation element 11 only needs to be greater than that in the case of a virtual object that is "soft and has strong elasticity", such as a balloon.

Further, in the case where the virtual object is "soft and has weak elasticity" like a sponge or a stuffed toy, the amount of gas to be supplied to the second pouch 12a of the second haptic presentation element 12 only needs to be less than that in the case of a virtual object that is "soft and has strong elasticity", such as a balloon.

Further, in the case where the virtual object is "hard and has no elasticity" like a canned drink (No in Step S105), only control of the amount of gas exhausted from the first pouch 11b of the first haptic presentation element 11 is performed (Step S113), and The control of the amount of gas to be supplied may be omitted while keeping the second pouch 12a of the second haptic presentation element 12 in the initial state. Also in this case, when the CPU of the VR/AR glasses 30 detects that the hand of the user has moved away from the virtual object (Step S114), the CPU of the VR/AR glasses 30 generates control information for returning the first haptic presentation element 11 to the initial state by supplying air at once into the first pouch 11b of the first haptic presentation element 11 in a depressurized state, and wirelessly transmits the generated control information to the haptic presentation apparatus 1 (Step S115).

As described above, the haptic presentation apparatus 1 according to this embodiment is capable of presenting the hardness of a virtual object by using the first haptic presentation element 11 of a simple structure that includes the air-tight and flexible first pouch 11b into which the object 11a is inserted. In addition, the hardness presented by the first haptic presentation element 11 can be easily varied by the amount of gas exhausted from the first pouch 11b. In addition, the haptic presentation apparatus 1 according to this embodiment is capable of presenting the elasticity of a virtual object by using the second haptic presentation element 12 of a simple structure that includes the air-tight and flexible second pouch 12a. Also the elasticity presented by the second haptic presentation element 12 can be easily varied by the amount of gas to be supplied to the second pouch 12a. This provides a haptic presentation apparatus that is compact, inexpensive, and capable of favorably presenting both hardness and elasticity at the same time.

Second Embodiment

Next, a second embodiment according to the present technology will be described.

Figure 11:
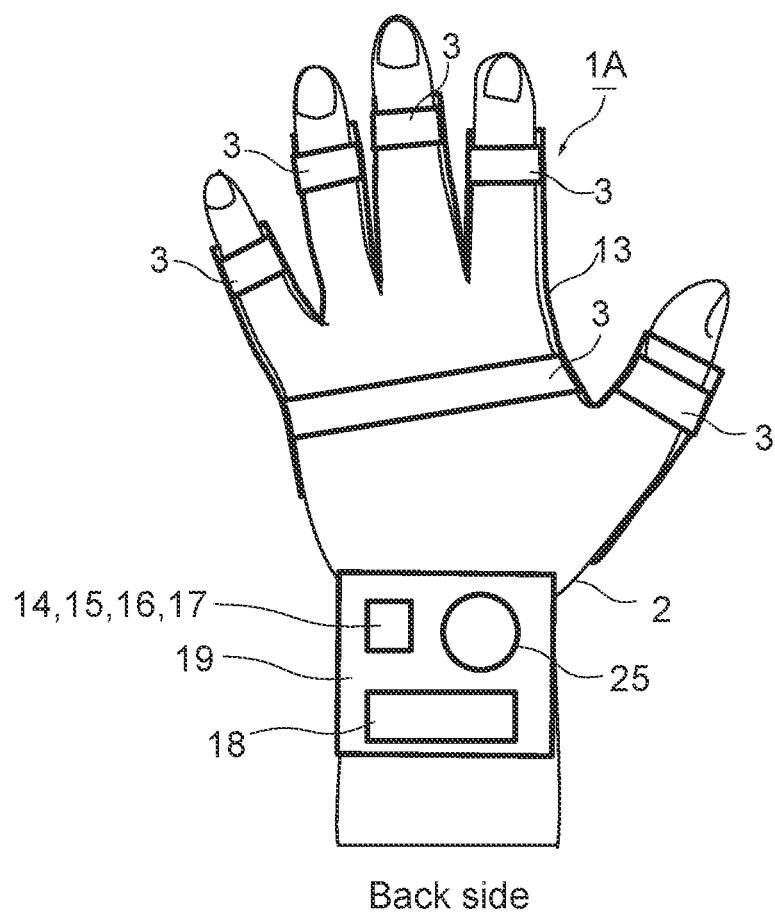
FIG. 11 is an external view of a haptic presentation apparatus 1A according to a second embodiment.

FIG. 11 is an external view of a haptic presentation apparatus 1A according to the second embodiment.

Figure 12:
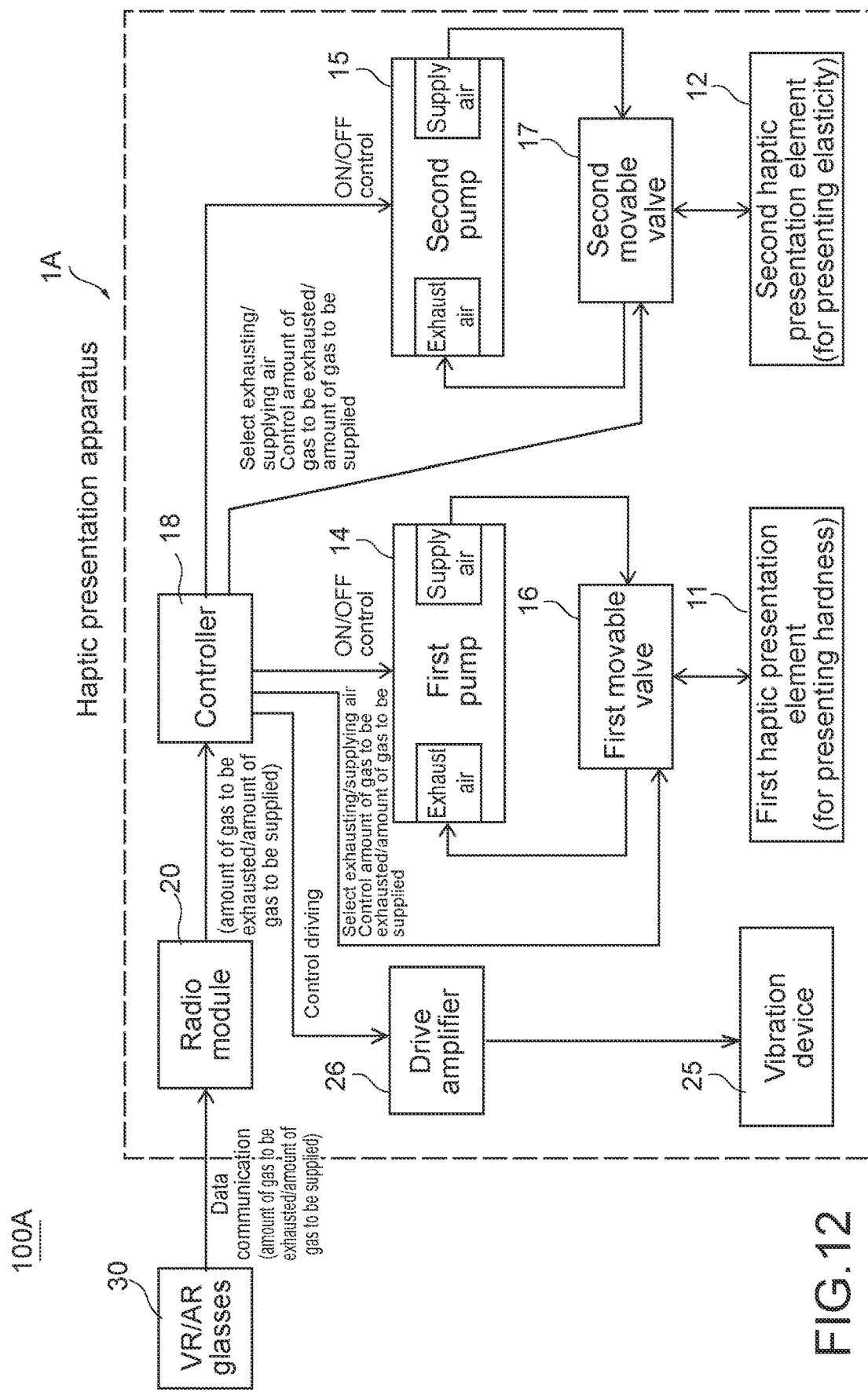
FIG. 12 is a block diagram showing a configuration of a haptic presentation system 100A that includes the haptic presentation apparatus 1A according to the second embodiment.

FIG. 12 is a block diagram showing a configuration of a haptic presentation system 100A that includes the haptic presentation apparatus 1A according to the second embodiment.

This haptic presentation apparatus 1A is configured by adding, to the haptic presentation apparatus 1, a vibration device 25 for presenting, by vibration, that a finger of a user has touched a virtual object in a VR/AR space and the finger of the user has moved away from the virtual object. The vibration device 25 may be mounted on, for example, the control unit 19 on which the first pump 14, the second pump 15, the first movable valve 16, the second movable valve 17, and the controller 18 are mounted. As the vibration device 25, a voice coil motor, an LRA (Linear Resonant Actuator), a piezoelectric element, an eccentric motor, an electrical-stimulation device, or the like can be employed.

When the CPU of the VR/AR glasses 30 detects that a finger of a user has touched a virtual object in a VR/AR space and the finger of the user has moved away from the virtual object, the CPU of the VR/AR glasses 30 wirelessly transmits control information for driving the vibration device 25 to the haptic presentation apparatus 1A. The controller 18 of the haptic presentation apparatus 1A that has received this control information controls a drive circuit 26 to supply a drive signal to the vibration device 25, thereby driving the vibration device 25 to vibrate the control unit 19.

The CPU of the VR/AR glasses 30 may transmit vibration waveform information to the haptic presentation apparatus 1A so as to drive the vibration device 25 with the vibration waveform corresponding to the properties of the virtual object. For example, vibration waveforms with low amplitudes and high frequencies are suitable for a virtual object that is "soft and has weak elasticity" such as sponges and stuffed toys, and vibration waveforms with high amplitudes and high frequencies are suitable for a virtual object that is "hard and has no elasticity" such as canned drinks. Further, vibration waveforms with low amplitudes and low frequencies are considered to be suitable for a virtual object that is "soft and has strong elasticity" such as balloons, and vibration waveforms with large amplitudes and low frequencies are considered to be suitable for a virtual object that is "hard and has strong elasticity" such as tennis balls. It goes without saying that these are examples, and vibration waveforms such that a user can intuitively discriminate the difference in hardness or elasticity of the virtual object may be adopted. Further, the user may arbitrarily set the vibration waveforms for combinations of the type, hardness, and elasticity of the virtual object.

Next, the control of the haptic presentation unit 13 on the position and movement of a hand of a user relative to a virtual object will be described in detail.

Figure 13:
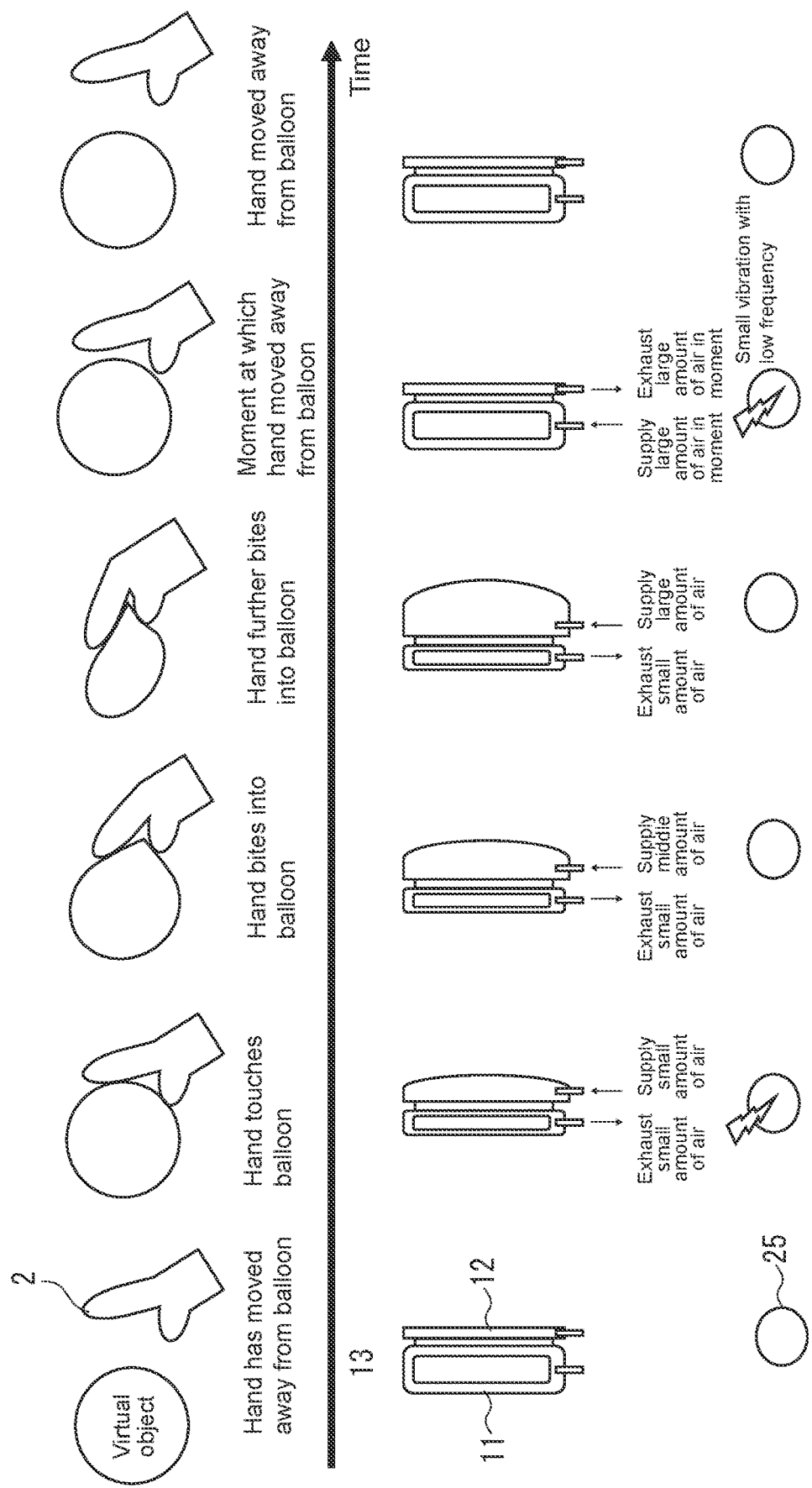
FIG. 13 is a diagram showing a flow of the control of the haptic presentation unit 13 on the position and movement of the hand 2 of the user relative to the virtual object along the time.

FIG. 13 is a diagram showing a flow of the control of the haptic presentation unit 13 on the position and movement of the hand 2 of the user relative to the virtual object along the time.

Figure 14:
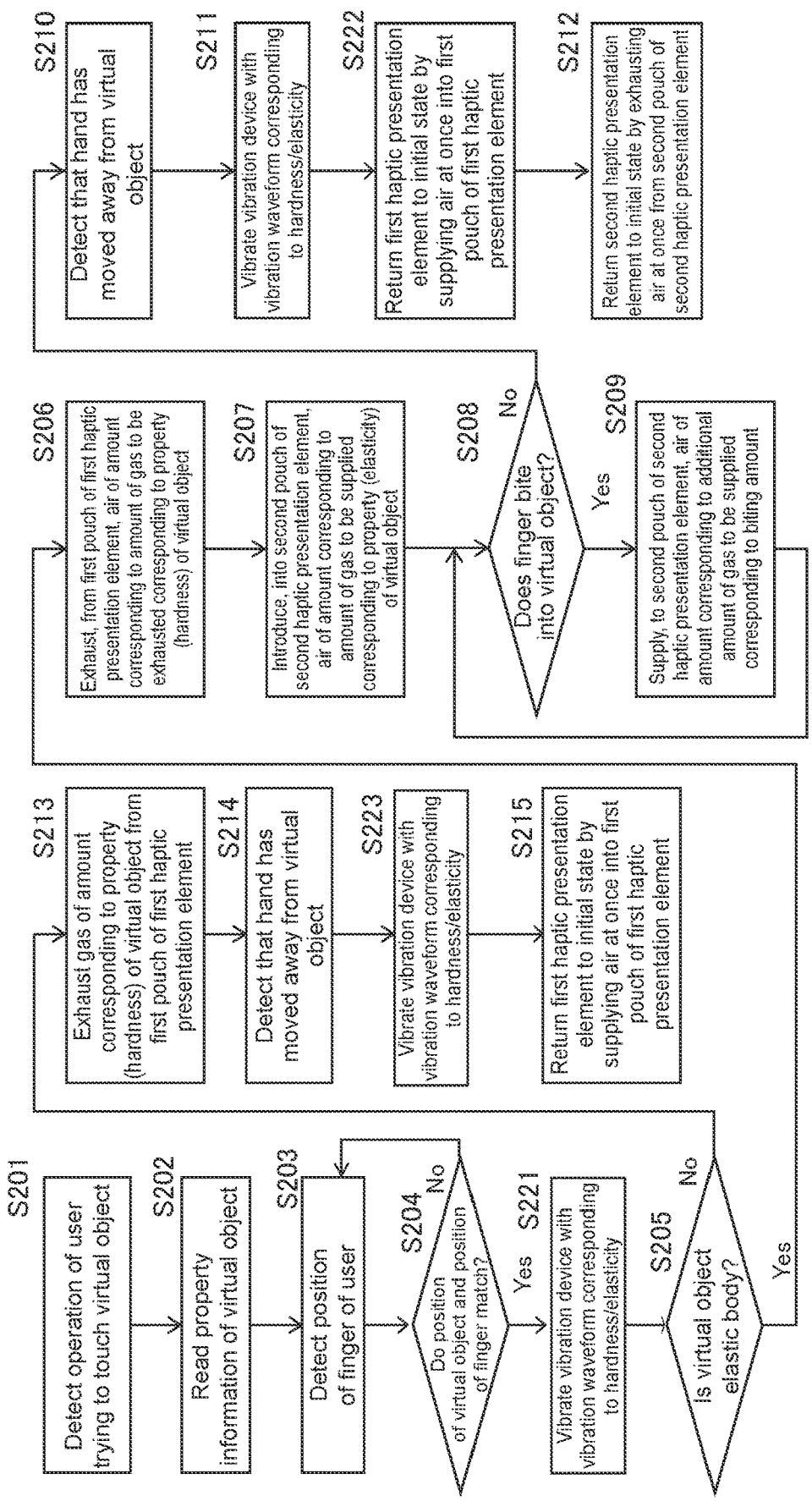
FIG. 14 is a flowchart showing the flow of the above-mentioned control by the CPU of the VR/AR glasses 30.

FIG. 14 is a flowchart showing the flow of the above-mentioned control by the CPU of the VR/AR glasses 30.

Here, assumption is made that the virtual object is a balloon.

In the flowchart of FIG. 14, the operations from Step S201 to Step S215 are the same as the operations from Step S101 to Step S115 in the first embodiment in the flowchart of FIG. 10.

In this embodiment, when the CPU of the VR/AR glasses 30 detects that a finger of a user has touched a virtual object in a VR/AR space (Yes in Step S204), the CPU of the VR/AR glasses 30 wirelessly transmits, to the haptic presentation apparatus 1A, control information for driving the vibration device 25 to drive the vibration device 25 of the haptic presentation apparatus 1A (Step S221). At this time, the CPU of the VR/AR glasses 30 sets, on the basis of information regarding hardness and elasticity that are the properties of the virtual object, the vibration waveform, and transmits control information including the vibration waveform information.

Figure 15:
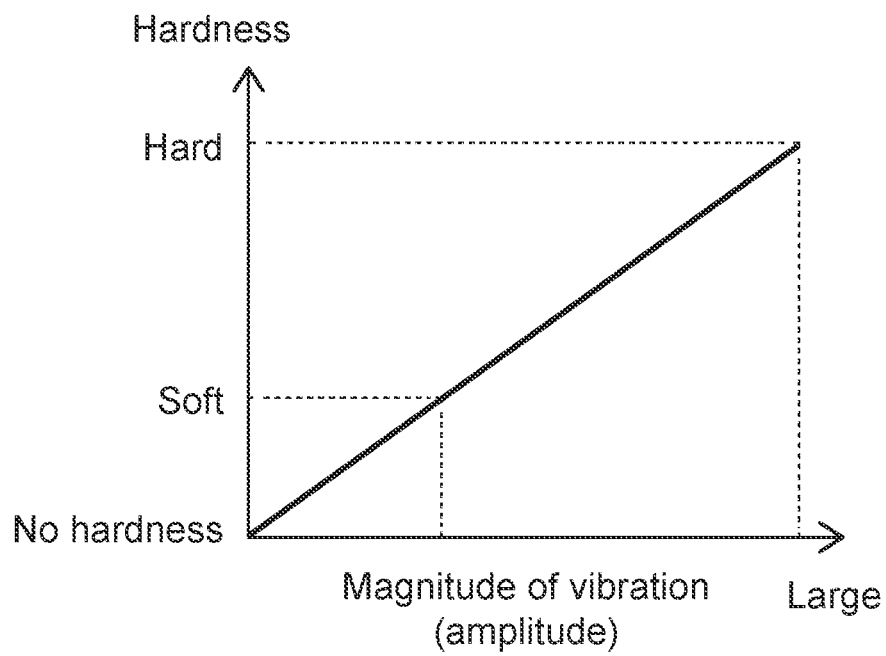
FIG. 15 is a graph showing the relationship between the hardness and the magnitude of vibration (amplitude).
Figure 16:
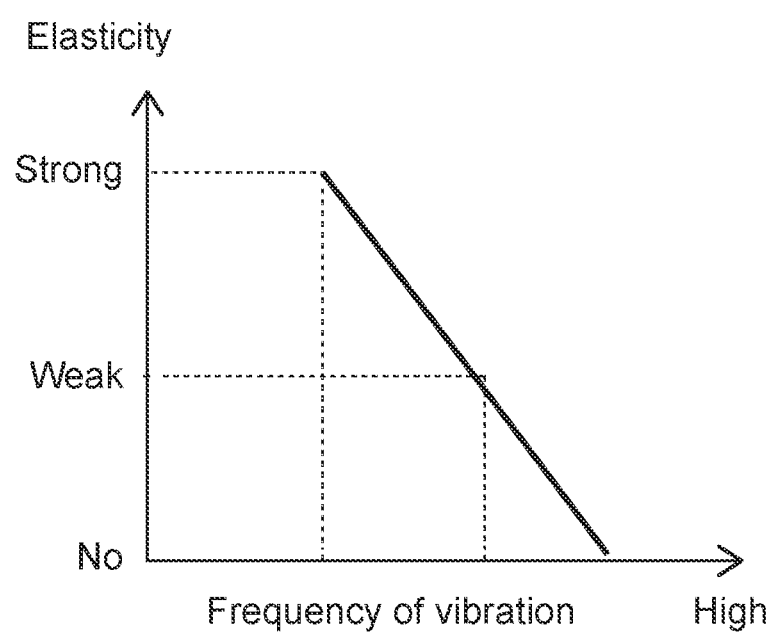
FIG. 16 is a graph showing the relationship between the elasticity and the frequency of the vibration.

FIG. 15 is a graph showing the relationship between the hardness and the magnitude of vibration (amplitude). FIG. 16 is a graph showing the relationship between the elasticity and the frequency of the vibration. As shown in the figures, the higher the hardness of the virtual object, the larger the amplitude of the vibration. The lower the elasticity of the virtual object, the higher the frequency of the vibration.

Further, also when the CPU of the VR/AR glasses 30 detects that the finger of the user has moved away from the virtual object in the VR/AR space (Yes in Step S210 and Yes in Step S214), the CPU of the VR/AR glasses 30 wirelessly transmits, to the haptic presentation apparatus 1A, control information for driving the vibration device 25, thereby vibrating the vibration device 25 of the haptic presentation apparatus 1A (Step S222, Step S223). At this time, the CPU of the VR/AR glasses 30 sets, on the basis of the information regarding the hardness and elasticity that are properties of the virtual object, the vibration waveform, and transmits control information including the vibration waveform information. Also at this time, the CPU of the VR/AR glasses 30 sets, on the basis of the information regarding the hardness and elasticity that are properties of the virtual object, the vibration waveform, and transmits control information including the vibration waveform information.

Note that here, although the vibration of the same waveform is generated at the time when the finger of the user has touched the virtual object and the time when the finger of the user has moved away from the virtual object, for example, the vibration time, the amplitude, the frequency, or the like may be changed between the time when the finger of the user has touched the virtual object and the time when the finger of the user has moved away from the virtual object.

Since vibrations are generated in the haptic presentation apparatus 1A when the finger of the user has touched the virtual object and when the finger of the user has moved away from the virtual object as described above, the user can experience the respective timings, and the operability is improved. In addition, by reflecting the hardness and elasticity of the virtual object, for example, in the case where a plurality of virtual objects with different properties is close to each other in the VR/AR space, one virtual object touched by the user can be sensed from the vibrational waveform, and further improvement in operability can be expected.

Modified Example 1

Next, a modified example of the haptic presentation apparatus according to the present technology will be described.

Figure 17:
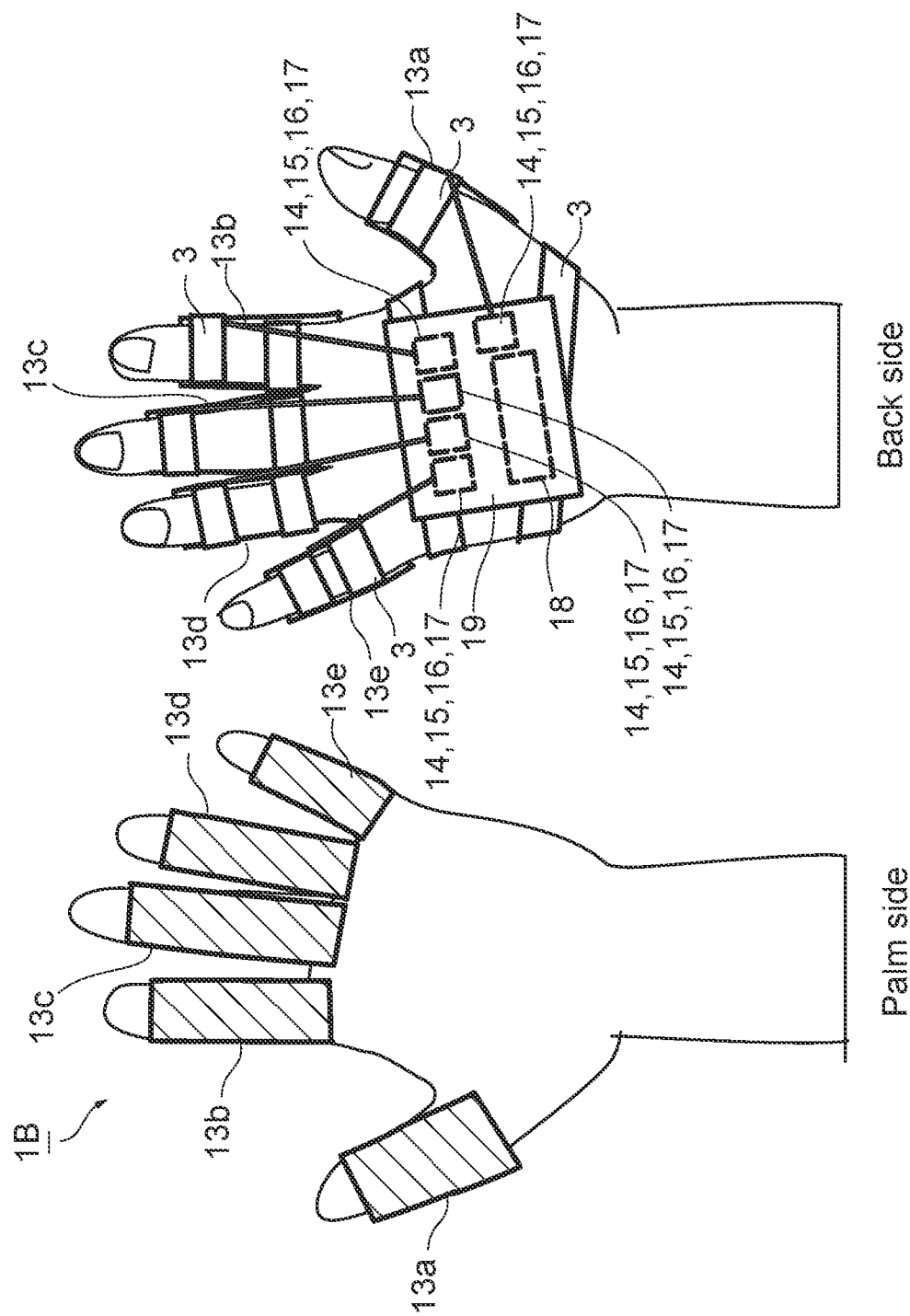
FIG. 17 is an external view of a modified example 1 of the haptic presentation apparatus.

FIG. 17 is an external view of a modified example 1 of the haptic presentation apparatus.

In this haptic presentation apparatus 1B, haptic presentation units 13a 13b, 13c, 13d, and 13e are provided independently for the respective fingers. Each of the haptic presentation units 13a 13b, 13c, 13d, and 13e may be configured by superimposing the first haptic presentation element 11 and the second haptic presentation element 12, or may be configured by the first haptic presentation element 11 alone. In the control unit 19 of this haptic presentation apparatus 1B, a plurality of movable valves and pumps for individually exhausting and supplying air from/to the respective haptic presentation units 13a, 13b, 13c, 13d, and 13e are provided corresponding to the respective haptic presentation units 13a, 13b, 13c, 13d, and 13e.

The amount of gas to be exhausted and the amount of gas to be supplied to/from the haptic presentation units 13a 13b, 13c, 13d, and 13e as well as the selection of the exhausting/supplying air are individually controlled by the controller 18 on the basis of the control information from the CPU of the VR/AR glasses 30. As a result, a more realistic haptic perception can be presented to a user in accordance with the shape of the virtual object, the manner of holding the virtual object, and the like. For example, the hardness can be presented by exhausting only two haptic presentation units corresponding to two fingers holding a small-sized or thin virtual object.

Modified Example 2

Figure 18:
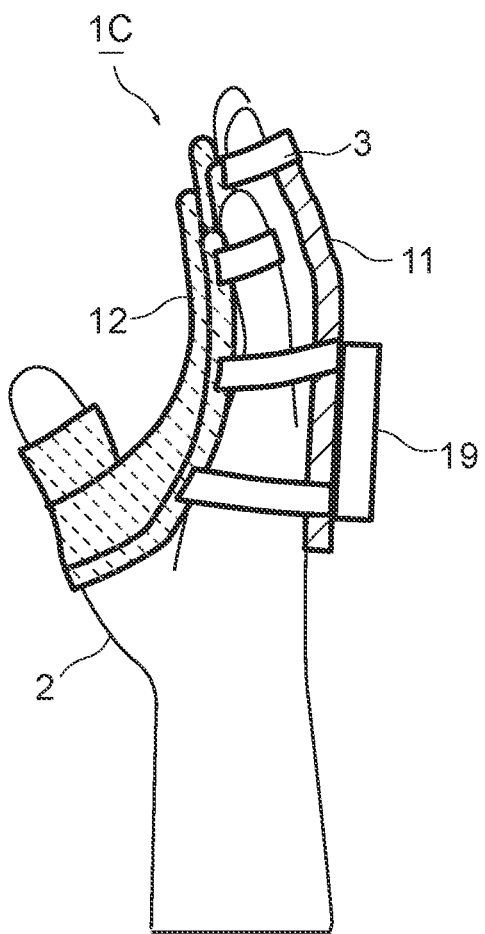
FIG. 18 is an external view of a modified example 2 of the haptic presentation apparatus.

FIG. 18 is an external view of a modified example 2 of the haptic presentation apparatus.

In the haptic presentation apparatus described so far, the palm-side thickness tends to be large because the first haptic presentation element 11 and the second haptic presentation element 12 of the haptic presentation apparatus are superimposed and disposed on the palm side. Further, since the first haptic presentation element 11 for presenting the hardness is present between the second haptic presentation element 12 presenting the elasticity and the actual palm, the elasticity presented by the second haptic presentation element 12 is difficult to be transmitted to the user in some cases.

A haptic presentation apparatus 1C according to a modified example 2 separates the first haptic presentation element 11 for presenting hardness and the second haptic presentation element 12 for presenting elasticity, the first haptic presentation element 11 is disposed on the side of a back of a hand of a user, and the second haptic presentation element 12 is disposed on the palm side. As a result, it is possible to suppress an increase in the thickness of the palm side, and realize a haptic presentation apparatus in which elasticity presented by the second haptic presentation element 12 can be directly sensed by the palm of the user.

Modified Example 3

Figure 19:
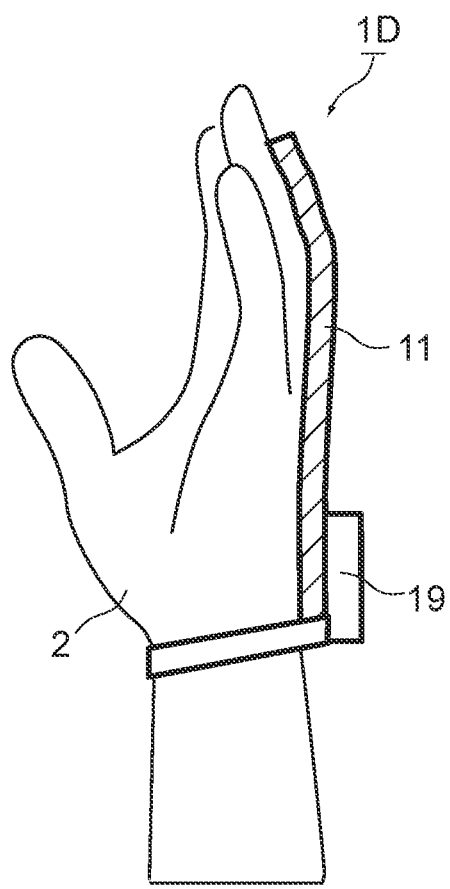
FIG. 19 is an external view of a modified example 3 of the haptic presentation apparatus.

FIG. 19 is an external view of a modified example 3 of the haptic presentation apparatus.

In this haptic presentation apparatus 1D, the first haptic presentation element 11 for presenting hardness is disposed on the side of a back of a hand of a user, but nothing is disposed on the palm side to expose the palm. That is, the haptic presentation apparatus 1D is configured to present the haptic perception of only the hardness of a virtual object to the user. Exposure of the palm of the user does not compromise the degree of freedom of operation by the hand of the user.

Figure 20:
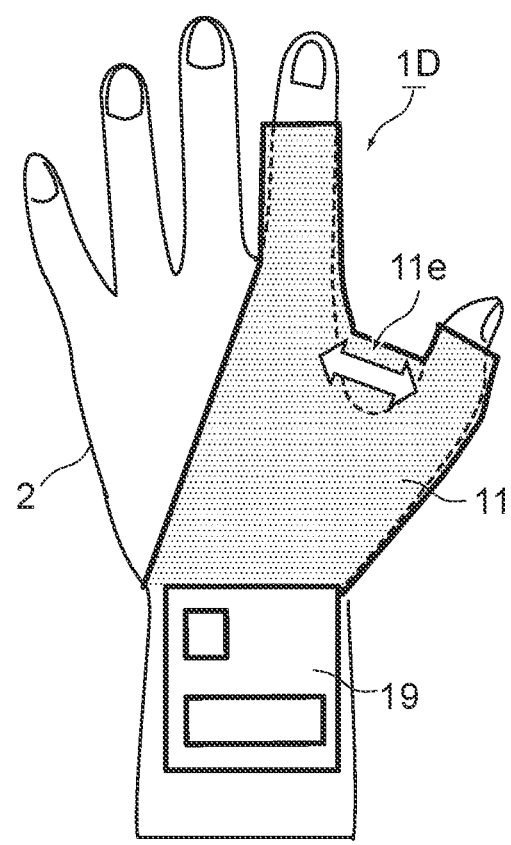
FIG. 20 is a side surface view of the side of the back of the hand of the haptic presentation apparatus according to the modified example 3 in FIG. 19.

Further, as shown in FIG. 20, in this haptic presentation apparatus 1D, the first haptic presentation element 11 is worn against the thumb and index finger of the hand, and a web portion 11e for enhancing the sense of resistance in response to an operation of holding an object with the thumb and the index finger is added between the portions of the first haptic presentation element 11 corresponding to the thumb and the index finger. As a result, it is possible to provide a more realistic haptic perception in response to the operation of holding a virtual object by the thumb and index finger of the hand of the user.

Modified Example 4

Figure 21:
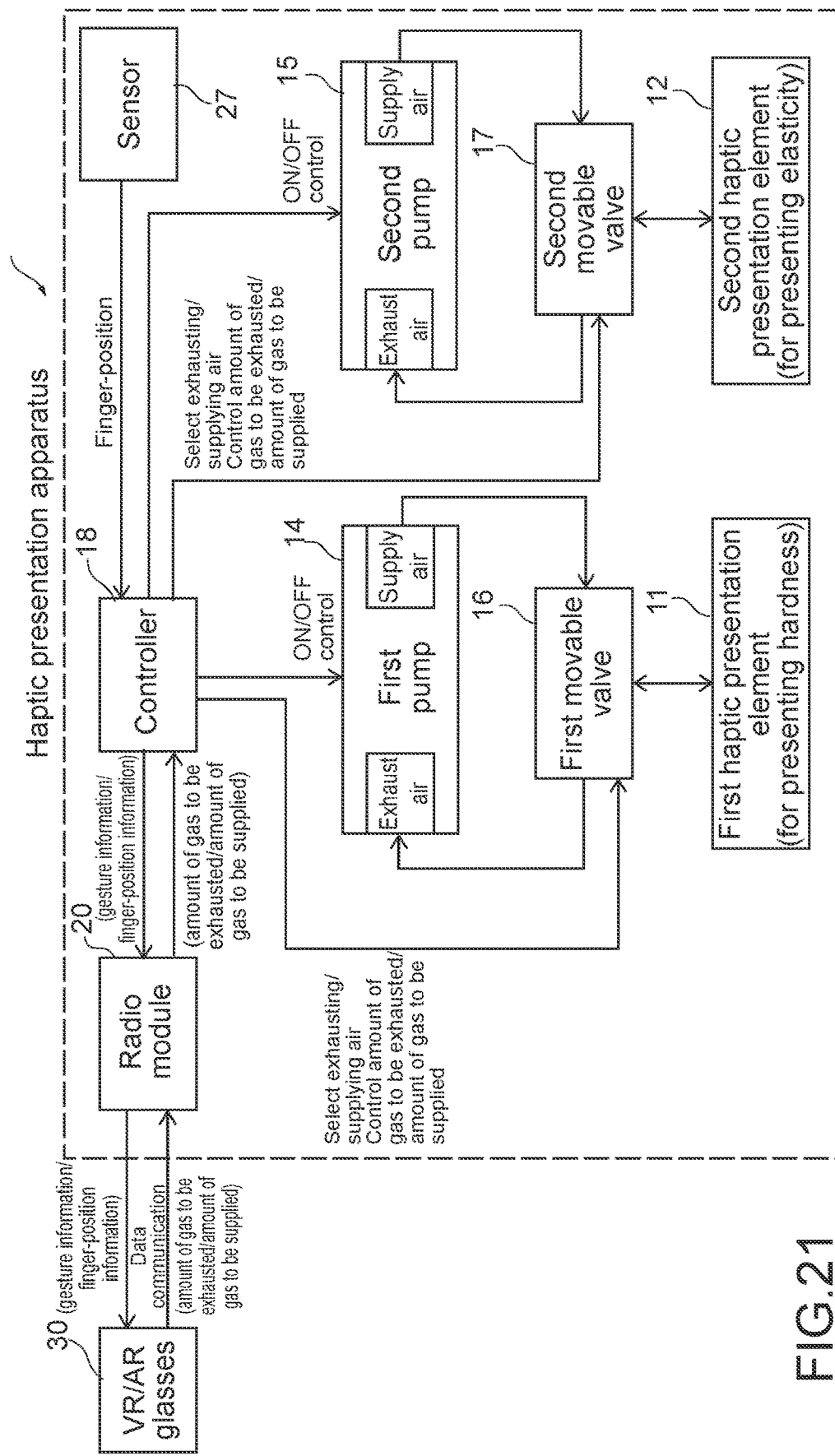
FIG. 21 is an external view of a modified example 4 of the haptic presentation apparatus.

FIG. 21 is a block diagram showing a configuration of a modified example 4 of the haptic presentation apparatus according to the present technology.

This haptic presentation apparatus 1E includes a sensor 27 that is used to detect the position and movement of fingers of a user. As the sensor 27, a camera, an acceleration sensor, a gyroscopic sensor, a TOF (Time of Flight) sensor, or the like can be used.

The controller 18 detects the position and movement of the fingers of the user from the output of the sensor 27 and transmits the detection data to the VR/AR glasses 30 using the radio module 20. The CPU of the VR/AR glasses 30 recognizes, on the basis of the detection data of the sensor 27 received from the haptic presentation apparatus 1E, a positional relationship between a virtual object and a hand of a user, generates control information as described above, and wirelessly transmits the generated control information to the haptic presentation apparatus 1E.

Modified Example 5

The second haptic presentation element 12 capable of presenting elasticity is capable of presenting vibrations to a user by successively switching the evacuating/supplying air as fast as possible. For example, the CPU of the VR/AR glasses 30 recognizes a vibration-triggering condition (e.g., a gesture that emits a beam of light) from the movement of a hand of the user, and transmits, to the haptic presentation apparatus, control information including the vibration waveform for vibrating the second haptic presentation element 12. At this time, the CPU of the VR/AR glasses 30 selects the vibration waveform corresponding to the type of the recognized gesture, the properties of the virtual object, the positional relationship between the virtual object and the fingers of the user, and the like.

[Another Configuration of Present Technology]

The present technology may also take the following configurations.

(1) A haptic presentation apparatus including:
a first haptic presentation element that includes an airtight and flexible first pouch into which an object has been inserted and is capable of presenting, by using an amount of gas to be exhausted from an interior of the first pouch, hardness of a virtual object in response to an operation of holding the virtual object by a user.

(2) The haptic presentation apparatus according to (1) above, in which the first haptic presentation element is disposed on a side of a back of a hand of the user.

(3) The haptic presentation apparatus according to (1) or (2) above, further including a first variable unit that varies an amount of gas to be exhausted to the interior of the first pouch.

(4) The haptic presentation apparatus according to any one of (1) to (3) above, in which the first haptic presentation element is disposed to abut against a thumb and an index finger of the hand of the user, and a web portion for enhancing a sense of resistance in response to the operation of holding the virtual object is provided to span between portions corresponding to the thumb and the index finger.

(5) The haptic presentation apparatus according to any one of (1) to (4) above, further including a second haptic presentation element that includes an air-tight and flexible second pouch and is capable of presenting, by using an amount of gas to be supplied to an interior of the second pouch, elasticity of the virtual object in response to the operation of holding the virtual object by the user.

(6) The haptic presentation apparatus according to any one of (1) to (5) above, in which the second haptic presentation element is disposed on a side of a palm of the user.

(7) The haptic presentation apparatus according to any one of (1) to (6) above, further including a second variable unit that varies an amount of gas to be supplied to the interior of the second pouch.

(8) The haptic presentation apparatus according to any one of (1) to (7) above, further including a vibration device that presents, by vibration, that the user has touched the virtual object.

(9) A haptic presentation system, including:

a haptic presentation apparatus including a first haptic presentation element that includes an air-tight and flexible first pouch into which an object has been inserted and is capable of presenting, by using an amount of gas to be exhausted from an interior of the first pouch, hardness of a virtual object in response to an operation of holding the virtual object by a user; and a control unit that controls, in accordance with hardness defined as a property of the virtual object, the amount of gas to be exhausted.

(10) The haptic presentation system according to (9) above, in which the haptic presentation apparatus further includes a second haptic presentation element that includes an air-tight and flexible second pouch and is capable of presenting, by using an amount of gas to be supplied to an interior of the second pouch, elasticity of the virtual object in response to the operation of holding the virtual object by the user, and the control unit controls, in accordance with elasticity defined as a different property of the virtual object, the amount of gas to be supplied.

(11) The haptic presentation system according to (9) or (10) above, in which the haptic presentation apparatus further includes a vibration device, and the control unit determines a vibration waveform of the vibration device on a basis of the property of the virtual object.

In addition, the present technology is not limited to the embodiments described above, and various modifications can be made within the scope without departing from the essence of the present invention.

REFERENCE SIGNS LIST 1 haptic presentation apparatus
11 first haptic presentation element
11a object
11b first pouch
11e web portion
12 second haptic presentation element
12a second pouch
13 haptic presentation unit
14 first pump
15 second pump
16 first movable valve
17 second movable valve
18 controller
19 control unit
25 vibration device
30 AR glasses
100 haptic presentation system

The invention claimed is:

1. A haptic presentation apparatus, comprising:
a first haptic presentation element that includes an air-tight and flexible first pouch that houses an object, wherein the first haptic presentation element is configured to present, by using an amount of gas to be exhausted from an interior of the air-tight and flexible first pouch, hardness of a virtual object in response to an operation of holding the virtual object by a user; and
a second haptic presentation element that includes an air-tight and flexible second pouch, wherein the second haptic presentation element is configured to present, by using an amount of gas to be supplied to an interior of the air-tight and flexible second pouch, elasticity of the virtual object in response to the operation of holding the virtual object by the user.

2. The haptic presentation apparatus according to claim 1, wherein the first haptic presentation element is on a side of a back of a hand of the user.

3. The haptic presentation apparatus according to claim 2, further comprising a first variable unit configured to vary the amount of gas to be exhausted from the interior of the air-tight and flexible first pouch.

4. The haptic presentation apparatus according to claim 3, wherein
the first haptic presentation element is configured to abut against a thumb and an index finger of the hand of the user,
the first haptic presentation element comprises a web portion configured to present a sense of resistance in response to the operation of holding the virtual object, and
the web portion spans between portions corresponding to the thumb and the index finger.

5. The haptic presentation apparatus according to claim 1, wherein the second haptic presentation element is on a side of a palm of the user.

6. The haptic presentation apparatus according to claim 5, further comprising a second variable unit configured to vary the amount of gas to be supplied to the interior of the air-tight and flexible second pouch.

7. The haptic presentation apparatus according to claim 6, further comprising a vibration device configured to indicate, by vibration, that the user has touched the virtual object.

8. A haptic presentation system, comprising:
a haptic presentation apparatus that includes:
a first haptic presentation element that includes an air-tight and flexible first pouch that houses an object, wherein the first haptic presentation element is configured to present, by using an amount of gas to be exhausted from an interior of the air-tight and flexible first pouch, hardness of a virtual object in response to an operation of holding the virtual object by a user; and a second haptic presentation element that includes an air-tight and flexible second pouch, wherein the second haptic presentation element is configured to present, by using an amount of gas to be supplied to an interior of the air-tight and flexible second pouch, elasticity of the virtual object in response to the operation of holding the virtual object by the user; and a control unit configured to:

control, in accordance with the hardness defined as a first property of the virtual object, the amount of gas to be exhausted from the interior of the air-tight and flexible first pouch; and control, in accordance with the elasticity defined as a second property of the virtual object, the amount of gas to be supplied to the interior of the air-tight and flexible second pouch.

9. The haptic presentation system according to claim 8, wherein the haptic presentation apparatus further includes a vibration device, and the control unit is further configured to determine a vibration waveform of the vibration device based on the first property and the second property of the virtual object.

10. A haptic presentation method, comprising:

in a haptic presentation apparatus including:

a first haptic presentation element that includes an air-tight and flexible first pouch that houses an object, wherein the first haptic presentation element is configured to present, by using an amount of gas to be exhausted from an interior of the air-tight and flexible first pouch, hardness of a virtual object in response to an operation of holding the virtual object by a user, and a second haptic presentation element that includes an air-tight and flexible second pouch is configured to present, by using an amount of gas to be supplied to an interior of the air-tight and flexible second pouch, elasticity of the virtual object in response to the operation of holding the virtual object by the user:

controlling the amount of gas to be exhausted from the interior of the air-tight and flexible first pouch, in accordance with the hardness defined as a first property of the virtual object; and controlling the amount of gas to be supplied to the interior of the air-tight and flexible second pouch, in accordance with the elasticity defined as a second property of the virtual object.

* * * * *